United States Patent [19]

Lorenzo Barroso

[11] Patent Number: 4,621,751
[45] Date of Patent: Nov. 11, 1986

[54] MULTIPLE, LONGITUDINAL FOLDING APPARATUS

[76] Inventor: Angel Lorenzo Barroso, Arquitecto Cabanes, s.n., Mataro (Barcelona), Spain

[21] Appl. No.: 761,492

[22] Filed: Aug. 1, 1985

Related U.S. Application Data

[62] Division of Ser. No. 487,766, Apr. 22, 1983, Pat. No. 4,533,164.

[30] Foreign Application Priority Data

Apr. 23, 1982 [ES] Spain .................................. 512263
Apr. 23, 1982 [ES] Spain .................................. 265171

[51] Int. Cl.$^4$ ............................................. A41H 43/00
[52] U.S. Cl. ......................................... 223/28; 223/37
[58] Field of Search ....................... 223/37, 38, 28, 32, 223/33, 34, 35

[56] References Cited

U.S. PATENT DOCUMENTS

| 654,515 | 7/1900 | Casterline | 223/37 X |
| 1,537,118 | 5/1925 | Kent | 223/37 X |
| 2,498,948 | 2/1950 | Flomen | 223/28 X |
| 3,348,458 | 10/1967 | Tipper | 223/28 X |
| 4,313,630 | 2/1982 | Barroso | 289/1.5 |

FOREIGN PATENT DOCUMENTS 00295446 1/1964 Spain .

Primary Examiner—Louis K. Rimrodt
Attorney, Agent, or Firm—Cushman, Darby & Cushman

[57] ABSTRACT

An apparatus for making multiple, longitudinal folds in a web of flexible material includes a pair of flat plates extending substantially parallel but spaced from each other with an array of posts extending between the plates with the distance between the posts decreasing along the length of the plates to form a narrow channel through which the flexible material is pulled; a plurality of staggered forming members are disposed along the path of transport to deflect the body of the flexible material to assist in the folding thereof.

5 Claims, 13 Drawing Figures

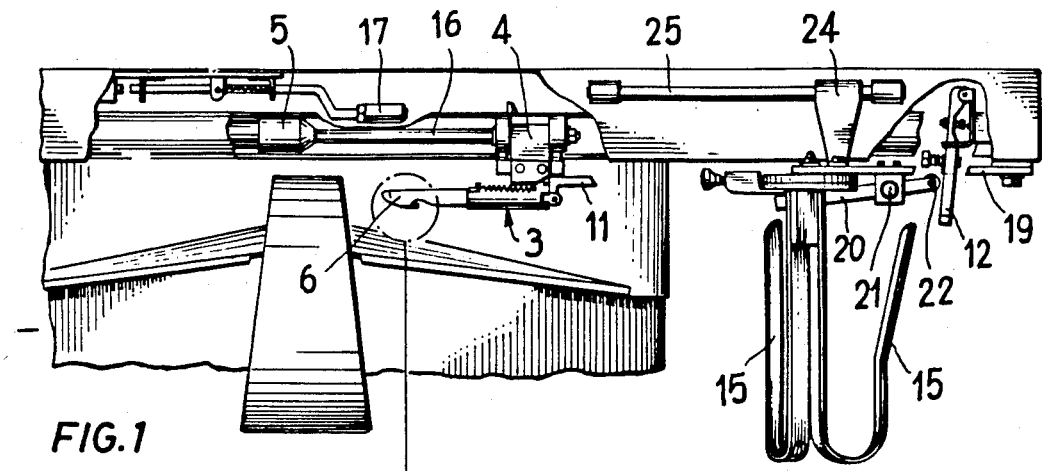
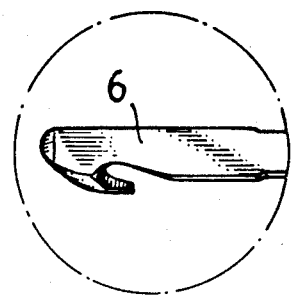
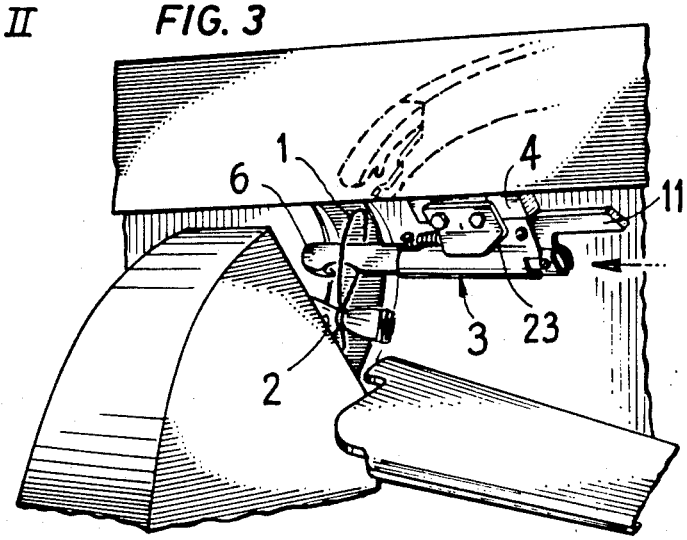
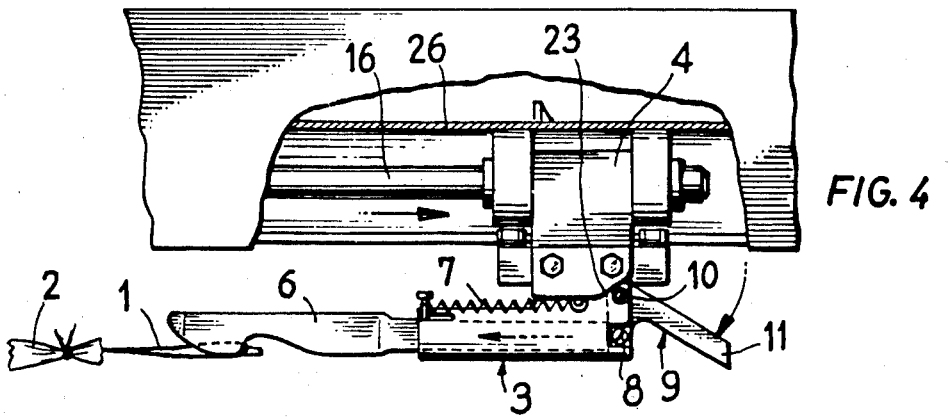

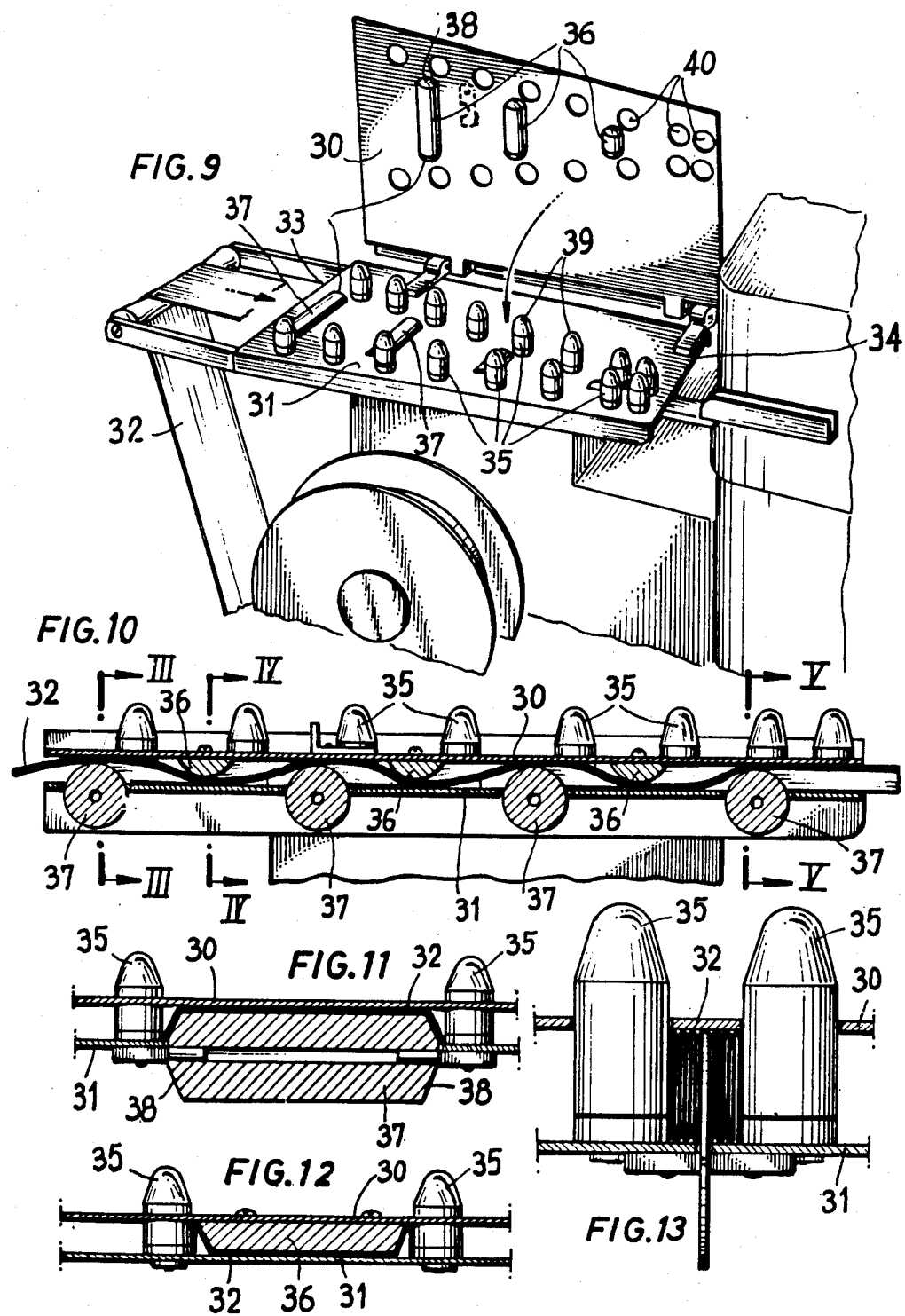

MULTIPLE, LONGITUDINAL FOLDING APPARATUS

This is a division of application Ser. No. 487,766 filed Apr. 22, 1983, now U.S. Pat. No. 4,533,164, 08/06/85.

The present invention refers to some improvements in equipment for knotting automatically the openings of flexible containers, similar to the equipment which makes a knot by forming an end which is used to hang the flexible container, such as, for example, sausage skin, coming from a rolling of folded tubular skin, and to the equipment which cuts the skin immediately after the opening of the following container has been knotted.

In the Spanish Pat. No. 475.086 of the same applicant, and which is the priority basis for U.S. Pat. No. 4,313,630 a method and device for knotting openings of flexible containers automatically is described. This method consists of a cord which forms a closed oblong loop which is incorporated in the process in loading rolls made up of a laminate strip of paper on one side of which the cord is arranged without there being any possibility of continuing.

By means of the mentioned method and device, a great advance in the automatic knotting of sausage skins is achieved, particulary in comparison with that described in the Spanish Pat. No. 295.446, also of the same applicant, and compared with any other method for knotting sausage skins already known. However, it is common practice in the sausage factories to cut empty skins to a seat length from a roll of folded tubular skin, knotting one of the ends by means of a corresponding loop and leaving the other end open so as to be able to introduce the corresponding meat matter at a later stage.

In all the systems known to date, this knotting of empty skins at one of the ends has to be done manually one by one, thus with the consequent employment of a person for the mentioned task, which implies a natural slowness in the realization, due to human limits.

By means of the improvements which are the object of the present invention, the operation can be realized completely automatically, in such a way that the operator in charge of the machine has only to concern himself with feeding the cord loads, the roll of hollow tubular skin and unloading the skins which are already cut and knotted at one of the ends.

Likewise, a device for forming multiple longitudinal pleats in the sausage skins is incorporated in the equipment for knotting the openings of flexible containers automatically.

With the object of improving the presentation of the tying or fastening of the ends of the sausages and of making the tension suffered by the skin in the mentioned tying or fastening operation uniform, the process of making a pleat in the skin before hand has been known for a long time.

This said pleating is carried out in one of two known ways: by means of a couple of toothed wheels, through which the skin is made to pass crosswise, or by means of the crosswise introduction of the skin among a series of parallel sheet strips which converge towards the exit opening of the pleated skin.

The toothed wheel system presents the most serious disadvantages of having the gear teeth affect the skin to the extent that they can even break it and of having to introduce the skins sideways one by one, thus preventing there being a continuous feeding of the skin.

The system which uses the converging parallel sheet strips offers the serious disadvantage in that the mentioned strips rub considerably against the skin, for which a heavy skin drive must be realized, and which also is affected by the mentioned rubbing.

Essentially, the improvements to which the present invention are directed, are characterized by the fact that they include means of hooking up the recently made loop and of driving a container and they are provided with a constant movement; some means of maintaining the mentioned constant movement; some means of driving the operating organ of the container drive cycle and of knotting and cutting the same; some means to graduate the cutting length of the container; some means for rejoining the containers once they have been cut; and a device for making multiple longitudinal folds in the tubular skin.

Other characteristics and advantages of the improvements to which the present invention is directed will be clear from the description given forthwith in relation to the enclosed drawings which illustrate, as a matter of a non-limitative example, a way of realizing the same.

FIG. 1 is a raised front view of a way of realizing the improvements of which the present invention is object.

FIG. 2 illustrates a detailed view of the shuttle hook.

FIGS. 3, 4, 5 and 6 are steps of different moments of the movement of the shuttle.

FIG. 9 shows a perspective view of the device for making multiple longitudinal folds in the tubular skin.

FIG. 10 is a view of the fold forming device described in FIG. 9, as a side view and cross section.

FIGS. 11, 12 and 13 are cross-sections steps in accordance with III—III, IV—IV and V—V of FIG. 10.

Figure 5:
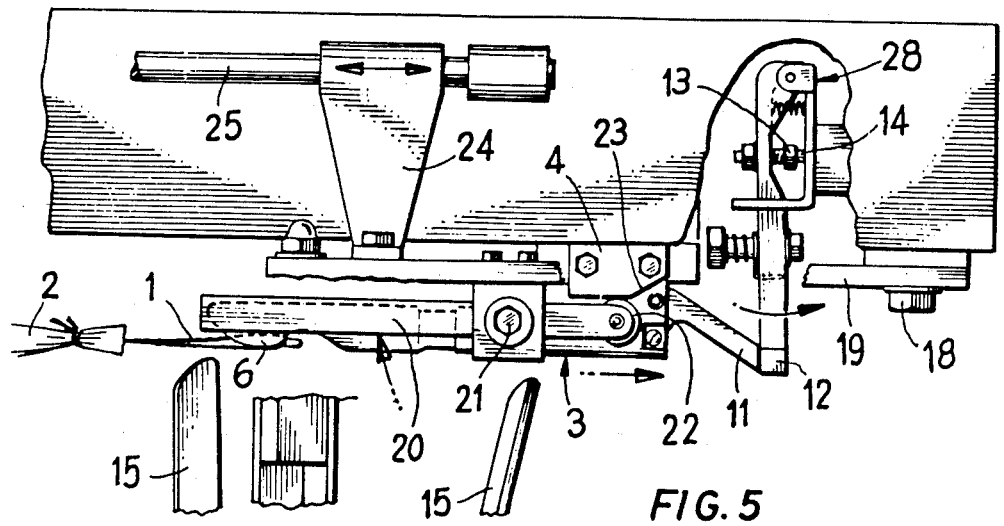

In the mentioned diagrams, it can be appreciated that, in a way of realizing the improvements in question, the recently realized loop (1) of a container (2) is hooked by some means provided with a constant movement which consist of a shuttle (3), which is equipped with a support (4) which is operated by the means produced by the constant movement.

In the mentioned shuttle (3) a hook (6) is provided. This hook comes out over the front end of the support (4), and is provided with a short longitudinal movement with respect to the latter and is submitted to the action of a drive spring (7) which tends to keep it drawn towards the support.

The rear part of the hook (6) is joined articulately in 8 to a branch of an angular lever (9), which is articulated rotationally on (10) to the support (4) at its pivot 10 and whose other free branch (11) comes out over the rear end of this.

In the initial idling position, the shuttle (3) is situated in its most distant position from the knotting point (FIG. 5). When the means making the constant movement are operated, the shuttle is driven by the said means up to the knotting point (FIG. 3), introduced in the loop (1) and starts the return (FIG. 4), hooking up the loop (1) and driving a portion of the folded tubular strip (2) until reaching the initial position (FIG. 5).

During the return (FIG. 4), the resistance offered by the tubular strip (2) overcomes the action of the drive spring (7) which acts upon the hook (6) and makes it move towards outside the support, which gives rise to the rear angular lever (9) turning round its articulation point (10) and its outer rear branch (11) adopting such a position that, in the return of the shuttle (3), the mentioned outer branch (11) runs against a lever (12 (FIG. 5) which makes up the mentioned means of driving the operation organ of the drive cycle of the strip and of the knotting and cutting. Thus the operation organ is actuated and a new cycle is begun, at the same time as a new knotting process is being carried out, a portion of tubular strip corresponding to a container is cut, and, when the shuttle (3) returns, the loop (1) of the mentioned portion of recently cut tubular strip (2) is freed from the hook and the strip falls because of gravity in such a way that the loop (1) remains hanging from a hook (15) set from underneath (FIG. 6), which makes up the rejoining means of the containers (2) which have already been cut.

Figure 8:
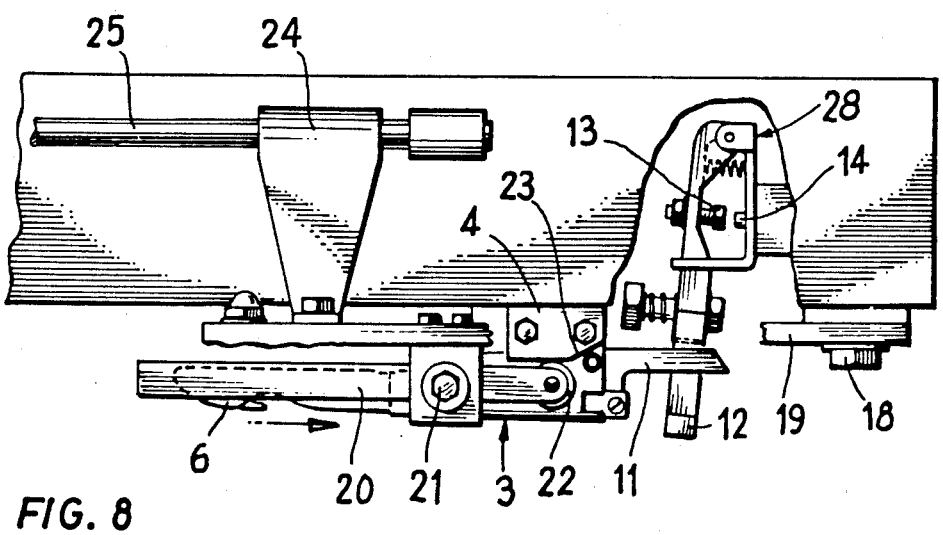
FIG. 8 is a representative view of the shuttle limit switch, when the shuttle returns to its original position without driving any container.

When the continuous cord feed for the knotting fails or when the tubular strip fails, the hook (6) of the shuttle (3) remains drawn towards the support just as illustrated in FIG. 8, and the outer branch (11) of the rear lever (9) adopts a position in which, in the return of the shuttl (3), it passes without encountering the drive lever (12) of the operation organ, and thus the device stops.

The means already mentioned for causing the constant back and forth movement in the shuttle (3) include a longitudinal pneumatic cylinder (5), whose piston is joined to the support (4) of the shuttle (3) by means of a rod (16), the said pneumatic cylinder (5) having to be put into operation in each cycle by means of the driving of the mentioned operation organ, which is more particularly formed by the stopping dog (13), jointly with the lever (12), which, when the lever is operated, rests on the pneumatic cylinder (5) and knotting and cutting device simultaneous drive push button (14). Near the place where the knotting and cutting takes place, there is a return stopping dog (17) which, when operated by the support (4) of the shuttle (3) in its feed, makes the direction of the piston of the cylinder (5) change.

The mentioned drive means of the operation organ of the cycle and the rejoining means of the already cut containers are displaceable longitudinally, so as to be able to be set at the convenient distance from the knotting point, in accordance with the desired length of each cut container (2). For this purpose, a screw (18) is provided. This screw is capable of being secured to the drive unit (28) in the protection casing (26), thus the mentioned screw (18) is moved throught the slot (27) at the same time as supporting the support bar (19) of the hooks (15). In FIGS. 1, 5, 6 and 8, the mentioned bar (19) is cut so as to make the diagrams easily comprehensible. By means of the described steps, the screw (18) can be secured to any position on slot (27).

As can be appreciated in the diagrams, there are two hooks (15), so that when one of them is full, it is sufficient to make it turn on its support until the other hook which is empty is in a position to receive the ties (1), and in such circumstances it is not necessary to stop the machine to remove the containers (2) which are cut from the hook (15) which is full.

Figure 6:
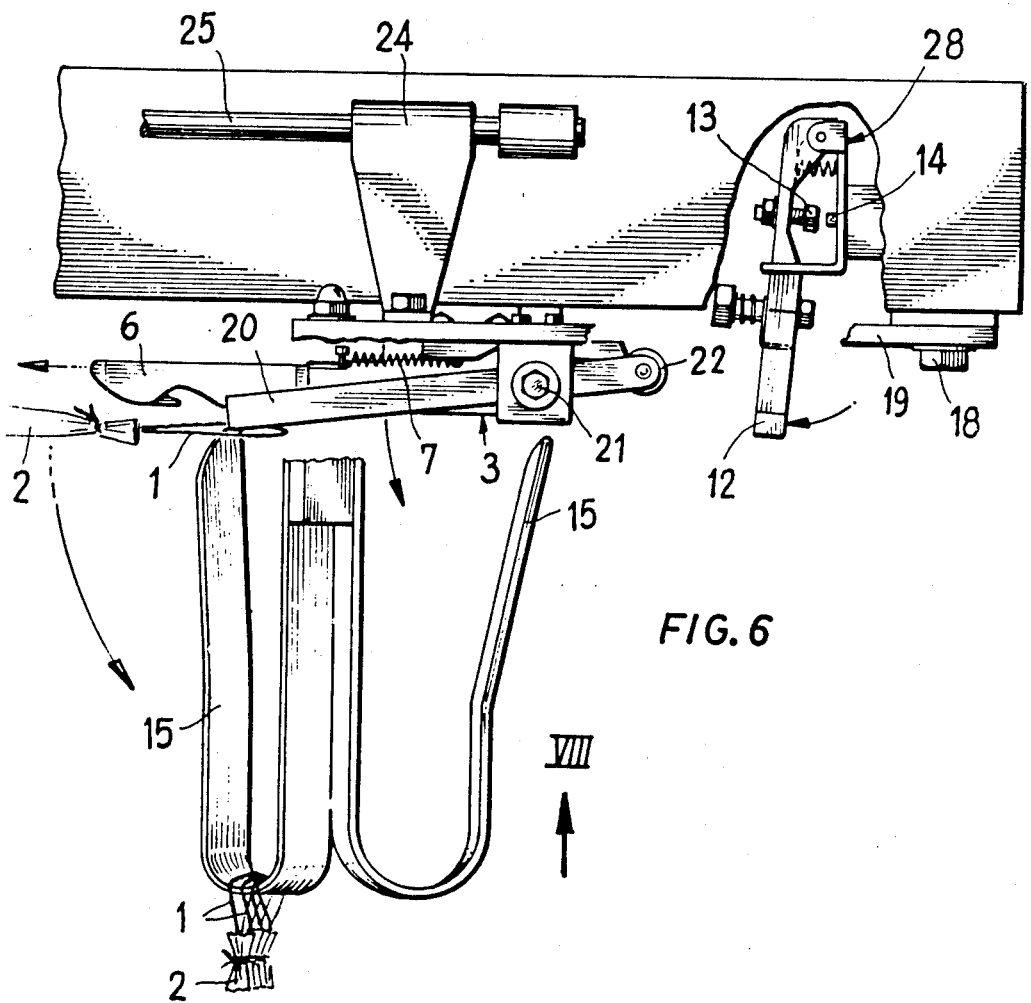
Figure 7:
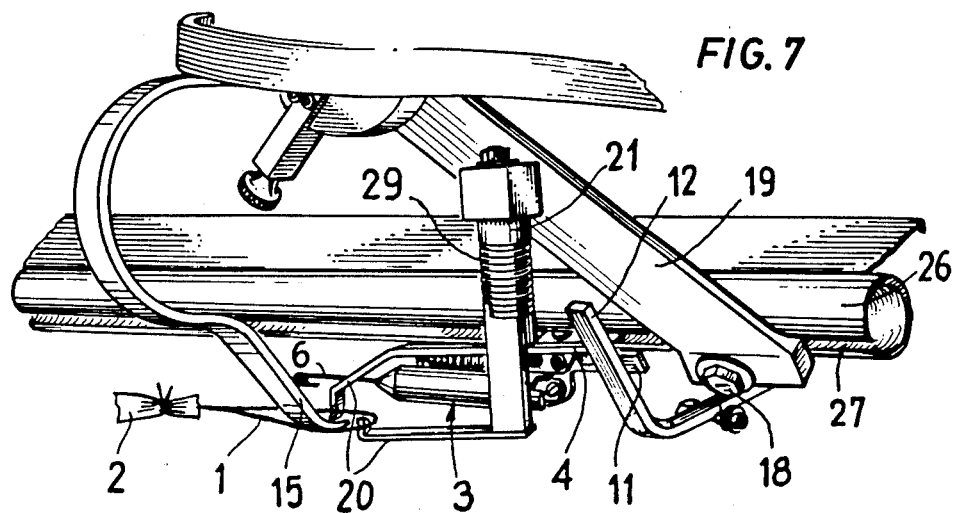
FIG. 7 illustrates a perspective view of the lower part of the hooking means and the rejoining means.

So as to facilitate the introduction of the loop (1) in the corresponding hook (15), some pushing rods (20) are provided. These rods help the tie to hook itself onto the hook (15) when the latter is detached from the shuttle (3), immediately after starting another cycle (FIG. 6). At the very same moment the cycle ends (FIG. 5), the set of rods (20), which is normally in a downward position thanks to the action of the torsion spring (29), is raised thanks to the fact that the sloping level (23) of the support (4) acts on a small wheel (22) in the free rear end of the rods (20) and makes them rotate round the axle (21), overcoming the action of the spring (29), until adopting the position shown in FIG. 5. When the sloping level (23) no longer comes into contact with the wheel (22), which coincides with the moment when the hook (6) has become unfastened from the tie (1) (FIG. 6), the rods (20) return to their original idling position and push the mentioned loop (1) downwards, thus obliging it to hook itself onto the hook (15).

The unit made up of the hooks (15) and the pushing rods (20) is capable of changing position thanks to the fact that it is suspended from the part (24) which can be moved along the guide bar (25).

In FIGS. 9 to 13, it can be appreciated that the device for making multiple longitudinal folds in the tubular skin in question includes two flat plates, an upper one (30) and a lower one (31), which are placed parallel and opposite each other at a short distance.

The laminate strip (32) which is to be folded passes continuously between the two plates, penetrating through one end (33) without being folded, and coming out the opposite end (34), already folded in multiple longitudinal folds.

The side spaces between both flat plates (30 and 31) are closed by means of lateral limiting elements (35), placed opposite each other in pairs which are closer together at the exit end (34) than at the entry opening (33).

On the inside of the space between the two plates (30 and 31), numerous transversal folding elements are placed, the upper ones (36) and the lower ones (37), being made up of rectilinear protuberances arranged transversely between the lateral limiting elements (35).

The ends (38) of the mentioned transversal folding elements (36 and 37) are separated from the mentioned limiting elements (35) by a similar distance or one less than that which separates each of the plates (30 and 31).

Preferably, the mentioned lateral limiting elements (35) are made up of free rotating rollers with an axle perpendicular to the plates (30 and 31).

In a preferable manner of realization, the mentioned free rotating rollers show their upper part (39) which is noticeably conical and adapted for crossing the plate (30) by the corresponding orifices (40).

The mentioned transversal folding elements of at least one of the flat plates, and in the case represented, the folding elements (37) of the flat plate (31), are advantageously made us of free rotating rollers, with an axle which is parallel to the plates (30 and 31).

The mentioned transversal folding elements (36 and 37) have preferably their ends slightly beveled.

Both flat plates (30 and 31) are detachable so as to facilitate the initial placement of the strip (32) which must be folded, for example by means of variegation, as shown in FIG. 9.

Having described the nature of the invention sufficiently, and also the method of putting it into practice, it is declared that all that does not alter, change or modify its fundamental principle may be subject to variations in detail.

I claim:

1. An apparatus for making multiple, longitudinal folds in a web of flexible material comprising a pair of flat plates extending substantially parallel but spaced from each other, pairs of edge engaging means extending between said plates for engaging the edges of a web fed between said plates, each plate having a plurality of folding elements with elements of one plate being staggered along a path in relation to said elements of said other plate.

2. The apparatus of claim 1 wherein said edge engaging means are freely rotating rollers each having a rotational axis extending perpendicular to said plates.

3. The apparatus of claim 1 wherein said folding elements of at least one of said plates includes freely rotating rollers each having a rotational axis extending parallel to said at least one plate.

4. The apparatus of claim 3 wherein said rollers have opposite ends which are beveled.

5. The apparatus of claim 1 wherein said plates are detachable for inserting a said web.

* * * * *